United States Patent

Thomas

[15] 3,680,112
[45] July 25, 1972

[54] REDIRECTIVE DUAL ARRAY ANTENNA

[72] Inventor: Richard K. Thomas, Wayne, Pa.
[73] Assignee: General Electric Company
[22] Filed: July 28, 1969
[21] Appl. No.: 845,198

[52] U.S. Cl. .......................................... 343/100 TD, 325/9
[51] Int. Cl. ........................................................ H01q 3/26
[58] Field of Search ......................... 343/100.6 R; 325/9, 14

[56] References Cited

UNITED STATES PATENTS 3,166,749   1/1965   Schelleng et al. ............... 343/100 TD
3,273,151   9/1966   Cutler et al. ...................... 343/100 TD

*Primary Examiner*—Richard A. Farley
*Assistant Examiner*—Richard E. Berger
*Attorney*—Allen E. Amgott, William G. Becker, Henry W. Kaufmann, Joseph B. Forman, Frank L. Neuhauser and Oscar B. Waddell

[57] ABSTRACT

Two circularly symmetrical concentric phase-steerable antenna arrays, scaled 3/2 in proportion to the wavelength at which each is designed to operate, have homologous radiators arranged in rings symmetrical about the common center. The radii of successive rings in a given array are 2.5, 4.75, and 5.75 times the radius of the innermost ring; the angular spacing of the radiators in each ring, beginning with the innermost, is 72°; 24°; 12.4°; and 10.28°. Each receiving radiator is tied to its homologous transmitting radiator through a network which corrects the phase of the received information band by reference to a receiving phase signal transmitted from the transmitting station, then further corrects the phase of the thus corrected information band by reference to a transmitting phase signal transmitted from the receiving station, and converts the thus doubly corrected information band to the transmitting frequency. As a result of the double phase correction, the frequency-converted information band is phase-steered to the receiving station.

1 Claim, 2 Drawing Figures

LEGEND:
⊗ = Balanced Mixer
▷ = Amplifier

INVENTOR:
RICHARD K. THOMAS,
BY Henry W. Kaufmann
AGENT

REDIRECTIVE DUAL ARRAY ANTENNA

BACKGROUND OF THE INVENTION

1. Field of the Invention

This invention pertains to phase-steerable antennas.

2. Description of the Prior Art

It is well known in the art to provide phase-steerable directional antenna systems in which the direction of the main lobe of the antenna is controlled at will by altering the relative phase differences produced by the interconnection of various parts of the radiating system. This practice has the advantage that beam direction may be altered without the mechanical complications inherent in rotating the complete physical structure of an antenna. An old example of such a system, in which mechanical motion is used to produce the phase change requisite to cyclical scanning, is the AN/APQ-7 radar equipment described in "Radar System Engineering", edited by L. N. Ridenour, 1947, McGraw-Hill Book Company, New York City, N. Y., pages 291–295. However, the possibility of using purely electrical means to produce phase changes has been exploited in later devices.

Phase-steering of linear arrays is relatively simple, since the phase difference between any two successive equally-spaced radiators will be the same, and a plurality of identical controllable phase-shifting elements in cascade may be employed.

The use of phase-steering in circular arrays creates a marked problem in that the phase differences between adjacent equally spaced elements are not constant, but a somewhat complicated function of the locations of the elements in azimuth relative to the array center. This complication eliminates the simple phase-steering techniques which are available for use with linear arrays.

SUMMARY OF THE INVENTION

I provide two antennas having a common center of symmetry, having equal numbers of homologous elements, having identical dimensions when expressed in units of the wavelength at which each is to operate. Thus both antennas have identical apertures, and produce identical beam patterns for a given pattern of phase relations among the various elements of each antenna. This property is particularly desirable in any application (such as the one to be described) in which reliance is placed upon identity of phase relationships among the elements of each array at its operating frequency with those among the elements of the other array at its operation frequency.

To cause the receiving array to be effectively phase-steered in the direction of the information signal band arriving from the transmitting station, and to cause the transmitting array to be phase-steered in the direction of a remote receiving station, two phase-reference pilot signals are provided, adjacent in frequency to the information signal band but with sufficient spacing from it and from each other to permit their being separated by standard selective filtering techniques. The first, or receiving phase pilot signal, is transmitted from the transmitting station. It is received by each receiving radiator with the information signal, filtered out from the information, and conjugated in phase. The phase-conjugated receiving phase pilot signal is then mixed with the information signal, producing an information signal which is in phase with the similarly treated information signal from any other receiving radiator of the array. A transmitting phase pilot signal is transmitted from the receiving station, received by each receiving radiator and conjugated in phase. The conjugated transmitting phase pilot signal is then mixed with the information signal which has previously been mixed with the phase-conjugated receiving phase pilot signal. This process shifts the phase of the information signal so that when, after suitable frequency conversion and amplification, it is applied to the transmitting radiator which is the homologue of the receiving radiator at which the information signal and the two phase pilot signals were received, the total radiation from that transmitting radiator and all the other transmitting radiators in the array (similarly connected through processing networks as here described to their homologues in the receiving array) will be a phase-steered beam directed in the direction from which the transmitting phase pilot signal arrived.

While the invention requires, in general, that a complete train of equipment be provided for each receiving radiator and its homologue transmitting radiator, this requirement is less formidable than it at first appears. First, semiconductor circuitry and miniaturization techniques permit ready quantity production of small identical components for production of a quantity of identical trains of equipment. Secondly, the subdivision of all the functions into functions of the separate trains of equipment reduces the maximum power required to be handled by any single train. Thirdly, the failure of any given train of equipment will render ineffective only one radiator in either array, so that randomly occurring equipment failures, even if individually catastrophic, will produce only a proportionate deterioration in the gain of the array, with results which will remain tolerable until a number of such failures have occurred. Thus this invention offers the peculiarly high reliability which results when failure will predictably be gradual, as distinct from the reliability achieved when, by great care, a very high probability of perfect operation is produced, but the probability of failure, however small, is of total sudden failure.

DESCRIPTION OF THE PREFERRED EMBODIMENT

Figure 1:
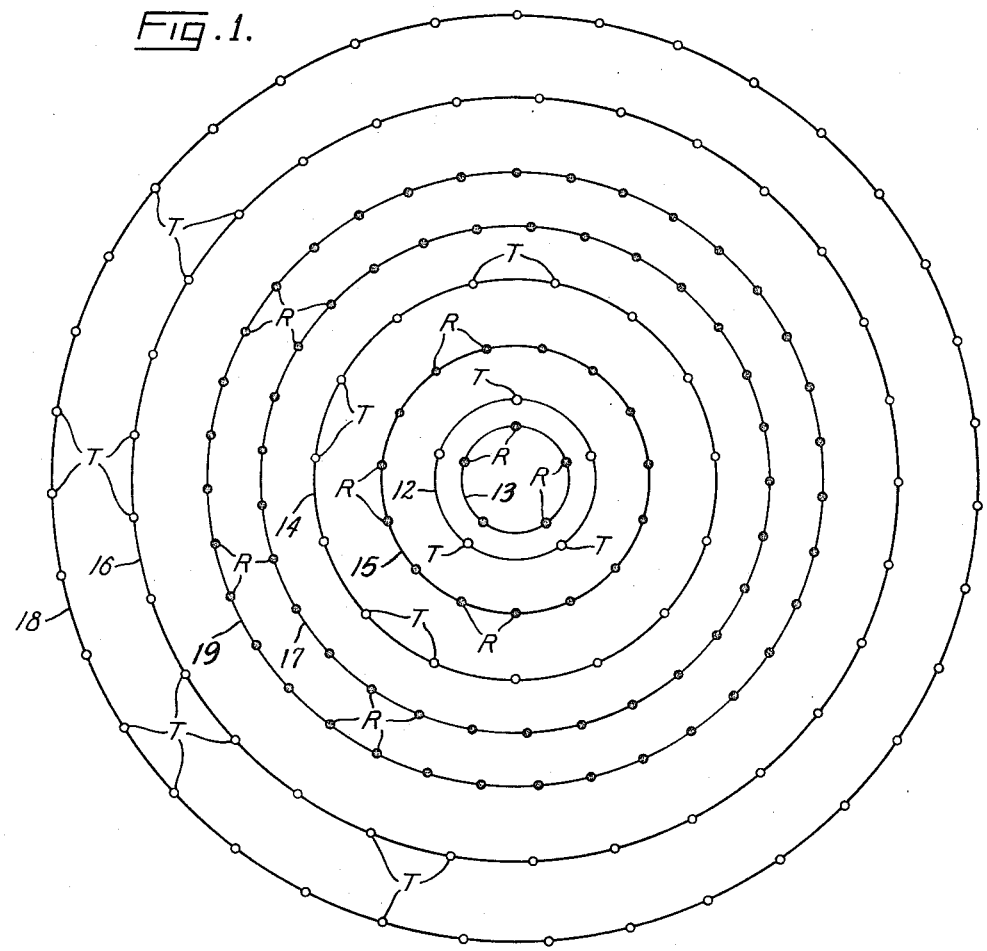
FIG. 1 represents a view of two concentric arrays of radiators according to my invention.

FIG. 1 represents two concentric arrays: a transmitting array of rings 12, 14, 16, and 18, and a receiving array of rings 13, 15, 17, and 19. The rings are merely reference marks to represent more clearly the position of the radiators located on them, radiators in the transmitting array being represented by the reference letter T, those in the receiving array being represented by the reference letter R. The transmitting and receiving arrays are geometrically similar, but the dimensions of the transmitting array are 1.5 times the homologous dimensions of the receiving array. Thus if the transmitting array is operated at a wavelength 1.5 times that at which the receiving array is operated, it will be identical in its characteristics and parameters with the receiving array, except for possible effects of cross coupling between the radiators of the two arrays. These effects are minimized in two ways; the individual radiators are preferably somewhat directive having broad patterns with maxima in a direction normal to the plane of the figure; and the design criterion is employed that, if a proposed ring diameter is such that it would bring a receiving ring close to a transmitting ring, that diameter ring is omitted.

The general characteristics of the array may best be explained by describing the manner of arriving at the particular embodiment represented in FIG. 1. Since the minimum practically desirable spacing between elements is one-half the longest proposed wavelength, that will be taken as the unit of measure. Since the chosen ratio of wavelength for the two arrays is 3 to 2, the radius of the innermost ring of the receiving array was chosen as 2 units. The homologous ring of the transmitting array is thus determined as 3 units; consequently no receiving array ring of 3 units radius is permissible. The next permissible radius for a ring of the receiving array is then 4 units, producing a homologous ring of the transmitting array having a radius of 6 units. The 5-unit radius is available for the third ring of the receiving array, creating a homologous 7.5-unit radius ring in the transmitting array. No ring between the 6-unit and 7.5-unit radii can be the minimal distance of one unit from both of these rings; consequently the next available radius for a ring of the receiving array is 8.5 units in radius, producing a transmitting array homologue of 12.75 units in radius. By a continuation of this approach, it becomes evident that additional receiving array rings of 9.5, 10.5, and 11.5 units radius, producing transmitting array homologues of 14.25, 15.75, and 17.25 units radius, are permissible. However, in order to achieve readily a minimization of the coupling between adjacent radiators, it is desirable to increase the spacing between rings even further than has been established by the procedure thus far followed. This is effected by eliminating alternate rings according to the following tabulation in which the radii of the rings eliminated are shown in parentheses:

| Receiving Array Radii | Transmitting Array Radii |
| --- | --- |
| 2 | 3 |
| (4) | (6) |
| 5 | 7.5 |
| (8.5) | (12.75) |
| 9.5 | 14.25 |
| (10.5) | (15.75) |
| 11.5 | 17.25 |

It should be observed that, because of the three to two ratio of transmitting array dimensions to receiving array dimensions, the spacing between successive transmitting array rings will be 50 percent greater than the spacing between corresponding (homologous) receiving array rings. This, however, can never permit the retention in the transmitting array of a ring whose receiving array homologue has been eliminated, since this would destroy the strict geometrical similarity between the two arrays.

The number of radiators in a given ring is determined by the same criteria of spacing as determine the spacing between successive rings. Since the circumference of a ring of radius R units is equal to 2 pi R units, the maximum number of radiators which can be spaced by at least unit spacing in such a ring will be very nearly the whole number less than, but nearest to 2 pi R. (This approximation neglects the difference between the distance along the arc between adjacent radiators and the length of the chord connecting them.) However, the same reasons which recommend the elimination of alternate rings to increase the radial distance between successive rings also suggest the elimination of alternate radiators around the circumference of a given ring. The effect of this procedure is as follows:

| Ring Radius | Permissible Number Of Radiators | Number of Radiators Actually Used |
| --- | --- | --- |
| 2 | 11 | 5 |
| 5 | 30 | 15 |
| 9.5 | 58 | 29 |
| 11.5 | 70 | 35 |

As in the elimination of alternate rings, the fact that spacing between radiators in a given ring of the transmitting array will be 50 percent greater than in the homologous receiving array ring does not permit the retention of more radiators in the transmitting array ring; there must be a one to one relation between receiving and transmitting radiators, with each transmitting radiator lying on the same radius from the center as its receiving homologue.

Thus there has been described a procedure which results in a plural array of radiators arranged in concentric rings, and having the following characteristics:

1. The plural array is made up of a number of individual arrays, geometrically similar, whose linear dimensions are proportional to the nominal wavelength at which the given individual array is intended to operate.
2. The individual arrays have a common center, and are made up of radiators arranged in circular rings around the common center.
3. The requirement of geometrical similarity of the various individual arrays leads to the following requirements:
    a. The number of rings in each individual array is the same as the number of rings in any other individual array;
    b. The radius of a given ring in an individual array is proportional to the nominal wavelength at which the given individual array is intended to operate;
    c. The radiators in a given ring are equiangularly spaced around its periphery;
    d. The number of radiators in a given ring of an individual array is the same as the number of radiators in the homologous ring of any other individual array, and a radiator in a given ring of an individual array lies on the same radius from the center as the homologous radiator in the homologous ring of any other individual array;
    e. Every radiator in the plural array is spaced from all other radiators by at least one-half the longest wavelength at which any individual array of the plural array is intended to operate.

The radiators actually employed are end-fire helices having a beam width of 34 degrees (which would correspond to a theoretical gain of slightly more than 14 db) and a measured gain of 12.5 db. The helix is a desirable form of radiator for this application because of its lack of polar selectivity (as contrasted e.g. with a dipole) and its structural convenience. However, the invention is applicable to use with any radiator having similarly suitable parameters.

The structure and underlying philosophy of the dual array has been described. It now remains to consider the application of its properties.

Figure 2:
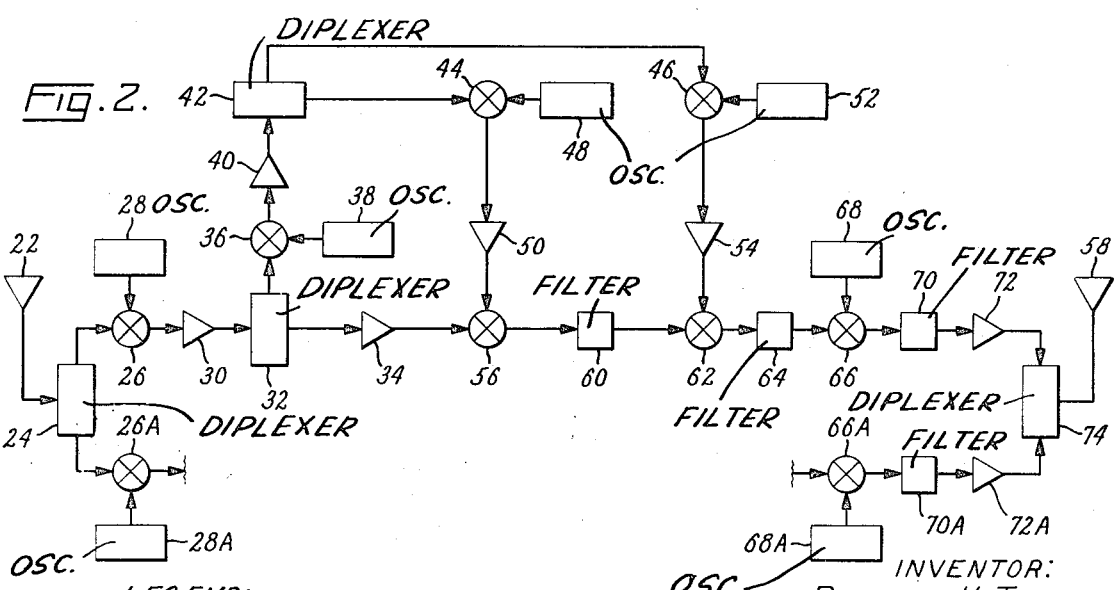
FIG. 2 represents symbolically the block diagrams of known elements connected for use to connect a receiving radiator with its homologous transmitting radiator in the arrays represented in FIG. 1.

Referring to FIG. 2, a receiving radiator 22 is represented connected to a diplexer 24, which is a frequency-selective filter which passes to a balanced mixer 26 received signals in the band from (in the specific embodiment constructed) 5925 to 6100 megahertz, and diverts to another balanced mixer 26A signals ranging from 6250 to 6425 megahertz. The received signal consists of an information band 175 megahertz wide, extending from 5925 to 6050 megahertz, a receiving phase pilot signal 6080 megahertz, and a transmitting phase pilot signal 6100 megacycles. This received signal is mixed, or heterodyned with the output, at 5825 megahertz, of local oscillator 28, and the output of balanced mixer 26, which is the difference between the frequency of local oscillator 28 and the frequency band of the received signals, extending from 100 to 275 megahertz, is amplified by amplifier 30. The amplified output of amplifier 30 contains (as may be confirmed by substraction) an information band at a frequency from 100 to 125 megahertz (corresponding to 5925 to 6050 megahertz in the received signal), the receiving phase pilot signal at a frequency of 255 megahertz, and the transmitting phase pilot signal at a frequency of 275 megahertz.

It should be noted that, since the output of balanced mixer 26 is the result of mixing the incoming signal with a local oscillator frequency lower than the frequency of the incoming signal, the phase of the various components of the incoming signal appears unchanged in the output of balanced mixer 26.

The output of amplifier 30 is fed to a frequency-selective filter, diplexer 32, which separates the information band 100–225 megahertz, feeding it to the input of amplifier 34, and the 255 and 275 megahertz pilot signals, transmitting them to the input of balanced mixer 36. Balanced mixer 36 mixes the 255 and 275 megahertz pilot signals with the 325-megahertz output of local oscillator 38, producing difference outputs at 50 and 70 megahertz, corresponding respectively to the 275 and 255 megahertz inputs to balanced mixer 36. Since the local oscillator 38 is higher in frequency than the frequencies of the 255 and 275 megahertz pilot signals at the input to balanced mixer 36, the phase of the resulting 70 and 50 megahertz pilot signals in the output is the conjugate of their phase at the input. These signals are fed to the input of amplifier 40, whose amplified output is fed to frequency-selective filter, diplexer 42, which separates the 50 and 70 megahertz conjugated pilot signals, feeding the 70 megahertz conjugated pilot signal to the balanced mixer 44 and the 50 megahertz conjugated pilot signal to balanced mixer 46. The 70 megahertz conjugated pilot signal is mixed with the 650 megahertz output of local oscillator 48, producing a sum output of 720 megahertz, which is amplified by amplifier 50. Since this mixing is additive, the phase of the 70 megahertz signal is not altered by the mixing; that is, it is still conjugate. Similarly, the 50 megahertz signal is mixed by balanced mixer 46 with the 650 megacycle output of local oscillator 52, producing an output of 700 megacycles which is still conjugate in phase. This latter output is amplified by amplifier 54. Since the difference frequencies in the outputs of balanced mixers 44 and 46 might be close enough to the desired addition frequencies to require filtering out, it is desirable that balanced mixers 44 and 46 be doubly balanced mixers, which produce only a single, sum output. Such mixers are used in the known art as modulators for single-sideband transmitters. A description of such mixers appears in the textbook "Communications Systems and Techniques" by M. Schwartz, W. R. Bennett, and S. Stein, McGraw-Hill Book Company 1966, at page 188.

The output of amplifier 50, which is the conjugated phase, at 720 megahertz, of the receiving pilot signal which was present in the original input signal at 6080 megahertz, is fed to a balanced mixer 56 where it is mixed with the output of amplifier 34, the 100–225 megahertz information signal, producing an additive output of 820–945 megahertz. Since this mixing is additive, it does not produce a new or additional phase conjugation; but it now becomes necessary to consider in detail what this additive output is in fact.

The receiving radiator 22 is only one of the plurality of receiving radiators represented in FIG. 1. Each such receiving radiator, being differently located in space from every other receiving radiator will, in general, receive the information signal in a different phase. The information signal received at each receiving radiator must (after amplification and frequency conversion) be adjusted in proper phase before being fed to the homologous transmitting radiator, so that the total array of transmitting radiators will produce a narrow beam aimed in the direction of the transmitting pilot signal. To do this it is necessary first to adjust the phase of the information signal from each receiving radiator to a common reference. Since the components of the information signal flicker unpredictably in amplitude and phase as the information content changes, the receiving pilot signal is included as a phase reference. It is sufficiently close in the spectrum to the information signal so that the relative difference in its phase at the different receiving radiators will be a close approximation to the relative difference in the phase of the information signal components at the same receiving radiators.

The mixing in balanced mixer 56 of each sinusoidal component of the information signal with phase-conjugated receiving pilot signal subtracts from the sinusoidal component of the information signal the phase of the receiving pilot signal; but, as has just been stated, this is very nearly the relative difference in phase of the information signal component itself. Thus the sinusoidal component of the information signal, as it appears in the output of balanced mixer 56, has been adjusted to eliminate the difference in phase between the sinusoidal information component as received at receiving radiator 22 and the same component as received and similarly corrected at any other receiving radiator in the receiving array represented in FIG. 1. It should be observed particularly that any imperfection in the approximation of the relative phase difference of the receiving pilot signal to the sinusoidal component of the information signal will appear in all the channels connected to all the receiving radiators, so that the sinusoidal information components at the outputs of all the balanced mixer homologous to balanced mixer 56 in all the homologous trains of equipment connected respectively to all the receiving radiators will be in phase with each other. Thus the description has arrived at a result of producing a received information signal which is in phase with the received information signal in every other similar channel connected to every other receiving radiator.

There now remains the problem of adjusting the phase of the information signal so that, when suitably frequency converted and amplified, and applied to radiator 58, it will be in proper phase, relative to the signals applied to all the other transmitting radiators in the plurality, to form a phase-steered beam directed in the direction from which the transmitting phase pilot signal was received at 6100 megahertz. Now, the transmitting frequency will be markedly different from the frequency at which the transmitting phase pilot signal was received; but, since the ratio of the dimensions of the transmitting array relative to the receiving array is proportional to the ratio of the transmitting wavelength to the receiving wavelength, the relative phase of the transmitting phase pilot signal received at receiving radiator 22 will be an accurate measure of the relative phase required at transmitting radiator 58 to produce a phase-steered beam directed in the direction from which the transmitting phase pilot signal was received. However, the phase of the transmitting phase pilot signal as received must be conjugated as applied to the transmitted signal for the following reason: consider the receiving radiator most remote from the source of the transmitting phase pilot signal. Such receiving radiator will be the last to receive a given peak of a given cycle of the transmitting phase pilot signal, and so the phase of the signal so received will lag behind the phase of the signal received at any other receiving radiator. But when a signal is transmitted from the homologous transmitting radiator, since the direction of travel is reversed, it must be the first to transmit a given peak of a given cycle of the transmitted signal, and so must lead the phase of the signal transmitted from any other transmitting radiator. Hence a lag in phase on reception must be converted into a corresponding lead by phase complementing; and it is effected according to the following description.

The output of balanced mixer 56 is fed through a band-pass filter 60 to eliminate any spurious signals resulting e.g. from imperfections in the balance of the mixer because of slight differences in the supposedly identical components used in the mixer. The filtered output from mixer 60 is then mixed additively in balanced mixer 62 with the output of amplifier 54. Since the output from band-pass filter 60 is the 820–945 megahertz information signal (corrected in phase, as has been described) and the output of amplifier 54 is the conjugately phased transmitting pilot signal, at 700 megahertz, the sum output is the information signal at 1520–1645 megahertz, phased conjugately to the phase of the transmitting phase pilot signal as received at 6100 megahertz. This output is passed through filter 64 to remove spurious components, and fed to balanced mixer 66, where it is mixed additively with 2280 megahertz output of oscillator 68. The output of balanced mixer 66, in the band 3800–3925 megahertz, is passed through band-pass filter 70 to remove components outside the started band, amplified by amplifier 72, and fed via diplexer 74 to transmitting radiator 58.

To recapitulate, it has been shown thus far how the incoming signal has been adjusted in phase to correct for the difference in time of arrival, or phase, of the signal at different receiving radiator, changed in frequency and amplified, and adjusted in phase to direct radiation from the plural of transmitting radiators in the direction from which the receiving phase pilot signal has arrived.

A parallel train of equipment, similar to that already described with corresponding components bearing similar reference numbers, but differentiated by the addition of the letter A to each designation, appears below that already described. This second train is adapted to receive from the lower output of diplexer 24 a received signal having information in the band from 6300 to 6425 megahertz, a receiving phase pilot signal at 6270 megahertz, and a transmitting phase pilot signal at 6250 megahertz. This is fed to balanced mixer 26A, where it is mixed with 6525 megahertz output of oscillator 28A.

The difference output is taken from mixer 26A, giving an information signal in the band from 100 to 125 megahertz, a receiving phase pilot signal at 255 megahertz, and a transmitting phase pilot signal at 275 megahertz. These are the same frequencies as are occupied by the corresponding signals in the output of mixer 26. While the taking of the difference signal from mixer 26A, with oscillator 28A having a frequency higher than component of the incoming received signal, will produce phase conjugation, this conjugation will be applied to both the pilot signals and the information signals. Since there is no relative phase conjugation between the information signal and the pilot signals, this conjugation produces no effect. After passing through the "A" designated chain of apparatus, the information signal from filter 64A arrives at balanced mixer 66A where it is mixed with the 5720 megahertz output of oscillator 68A. In this case, too, the difference output of 4075 to 4200 megahertz is taken. This, too, will produce a phase conjugation; but since the same conjugation will occur in every homologous mixer in the apparatus connected to the array, there will be no net effect from this conjugation.

The oscillators bearing reference numbers 28, 38, 48, 52, and 68 (and their cognates 28A, et cetera) determine by their phases the adjusted phase of the received information signal, and the subsequently adjusted phase of that signal. Since it is essential that these adjustments be correct with respect to phase adjustments performed in cognate trains of equipment connecting other pairs of receiving and transmitting radiators, it is necessary that the phases of these oscillators be identical with the phases of corresponding oscillators in the other trains of equipment. This is most simply effected by having oscillators 28, 38, 48, 52, and 68 common to all the trains of equipment.

It is envisaged that the particular embodiment here described would be well suited to relaying two-way communication between two stations both located within the phase steering capability of the array represented generically in FIG. 1, with a first station transmitting information at 5925–6050 megahertz with a receiving phase pilot signal at 6080 megahertz to permit phase adjustment of the phase of the received information in the upper train of equipment represented in FIG. 2, and also transmitting a transmitting phase pilot signal at 6250 megacycles to permit phase steering back to the first station of information transmitted via the lower train of equipment represented in FIG. 2. A second station at another location would transmit information at 6300–6425 megahertz with a receiving phase pilot signal at 6270 megahertz to permit phase adjustment of the received information in the lower train of equipment represented in FIG. 2, and also transmitting a transmitting phase pilot signal at 6100 megacycles to permit phase steering back to the second station of information transmitted via the upper train of equipment represented in FIG. 2.

It is evident that this proposed use is merely a somewhat arbitrary one suggested simply because it meets a very common need for simultaneous two-way relay communication. One-way relaying could be achieved by using only the upper train of equipment. In that case, the transmitting station would transmit the appropriate information band and associated receiving phase pilot; and the receiving station would transmit only the proper frequency of transmitting phase pilot signal to direct the relayed information back to itself. Another possibility is to employ more than two trains of equipment in parallel, with the diplexers 24 and 74 being suitably modified to separate or blend the more than two bands of signals. It should be observed that so long as the ratio of received to transmitted frequencies is the same as the reciprocal of the ratio of the physical dimensions of the receiving to the transmitting arrays, the phasing methods here disclosed will function effectively, although the particular frequencies employed may conceivably be so far from the optimum operating frequencies for the arrays that the effectiveness of the arrays may be diminished. The term: "ratio of received to transmitted frequencies" here used is necessarily subject to reasonable interpretation in view of the fact that bands of the same finite width are employed for reception and retransmission of information, at different places in the spectrum, so that even the ratio of the high edge of the lower edge of the received to the lower edge of the received to the lower edge of the transmitted band. The accuracy with which the ratio of frequencies approximates the ratio of dimensions will determine how accurately the phasing to form the transmitted beam can be accomplished. An old criterion for adequate accuracy in parabolic reflectors was that the surface be within one-eighth wavelength of its intended location. This would correspond to a tolerance of the same fraction in frequency ratio. More precise requirements for beam formation and steering would, of course, require closer approximation in the frequency ratio; but both may be regarded as coming within the scope of the general statement as to reasonable interpretation.

I claim:

1. A phase-steered relay antenna system comprising:
   a. a circularly symmetrical receiving array of a plurality of receiving radiators;
   b. a circularly symmetrical transmitting array of a plurality of transmitting radiators, concentric with the receiving array, equal in number to the plurality of receiving radiators, geometrically similar to the receiving array; each transmitting radiator being the homologue of a receiving radiator and lying on the same radius from the center of symmetry of both arrays as does that receiving radiator; the ratio of the distance of each transmitting radiator along the said radius from the said center of symmetry to the distance of the receiving radiator homologous to the said transmitting radiator along the said radius from the said center of symmetry being the same as the ratio of the wavelength to be transmitted to the wavelength to be received;
   c. a plurality of equipment trains, one such train being connected to each receiving radiator, each such train comprising:
   first means to adjust the phase of a received information band signal with respect to the phase of a received receiving phase pilot signal;
   second means to adjust the phase of the said received information band signal, adjusted with respect to the phase of the said receiving phase pilot signal, with respect to the phase conjugate of a received transmitting phase pilot signal;
   third means to convert the frequency of the said received information band signal to a different frequency for transmission;
   fourth means to receive the said received information band signal, after it has been adjusted in phase with respect to the phase of the received receiving phase pilot signal and with respect to the phase of the received transmitting phase pilot signal, and converted in frequency for transmission, and connect it to the transmitting radiator which is the homologue of the said receiving radiator;
   in which
   d. the radiators of a first said circularly symmetrical array are arranged in first concentric rings;
   the radiators of a second said circularly symmetrical array are arranged in second concentric rings concentric with the said first concentric rings;
   the diameters of the said first concentric rings are proportional to the shorter of the wavelength to be transmitted and the wavelength to be received;
   the diameters of the said second concentric rings are proportional to the longer of the wavelength to be transmitted and the wavelength to be received;

e. the diameter of the smallest first concentric ring differs from the diameter of the smallest second concentric ring by the said longer wavelength;

every other first concentric ring has a diameter greater by two said longer wavelengths than the next smaller ring without regard to which array the next smaller ring belongs to;

f. the radiators in a first concentric ring are equally spaced from each other and the spacing between a radiator and its nearest neighbor in the ring is approximately one said longer wavelength;

g. the radiators are unidirectional in gain characteristic, and are arranged with their directions of maximum gain normal to the plane of the ring of which they form a part.

* * * * *